(12) United States Patent
Saito

(10) Patent No.: US 12,530,159 B2
(45) Date of Patent: Jan. 20, 2026

(54) SERVER AND NON-TRANSITORY COMPUTER-READABLE RECORDING MEDIUM FOR COMMUNICATION SYSTEM

(71) Applicant: Brother Kogyo Kabushiki Kaisha, Nagoya (JP)

(72) Inventor: Ken Saito, Tokoname (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 219 days.

(21) Appl. No.: 18/162,736

(22) Filed: Feb. 1, 2023

(65) Prior Publication Data
US 2023/0266934 A1    Aug. 24, 2023

(30) Foreign Application Priority Data
Feb. 22, 2022    (JP) .................................. 2022-026135

(51) Int. Cl.
G06F 3/12    (2006.01)
H04L 9/40    (2022.01)

(52) U.S. Cl.
CPC .......... *G06F 3/1288* (2013.01); *G06F 3/1219* (2013.01); *G06F 3/1253* (2013.01);
(Continued)

(58) Field of Classification Search
CPC ......... H04L 63/08; G06F 3/12; G06F 3/1285; G06F 3/1238
See application file for complete search history.

(56) References Cited

U.S. PATENT DOCUMENTS 7,099,026 B1 * 8/2006 Hren ...................... G06K 15/00
358/1.6
2012/0194854 A1 * 8/2012 Tang ..................... G06F 3/1231
358/1.15

(Continued)

FOREIGN PATENT DOCUMENTS

JP         2006340215 A  * 12/2006
JP         2016-193592 A    11/2016

Primary Examiner — William R Korzuch
Assistant Examiner — Aditya Sriram
(74) Attorney, Agent, or Firm — KENEALY VAIDYA LLP

(57) ABSTRACT

A controller of a server is configured to perform first obtaining a notification destination for an administrator of the communication device from a first device, second obtaining a first request for information to use the communication device from a second device, first associating the notification destination, authentication information required to use the communication device, and identification information of the communication device, first transmitting the authentication information to the second device, third obtaining the authentication information from a third device based on the authentication information received by the second device, second transmitting a second request for administrator information to identify the administrator to the notification destination associated with the authentication information obtained from the third device, fourth obtaining a response transmitted by the administrator's device based on the second request and containing the administrator information, and second associating the administrator information with the identification information of the communication device.

18 Claims, 10 Drawing Sheets

(52) U.S. Cl.
CPC ............ *H04L 63/08* (2013.01); *G06F 3/1222* (2013.01); *G06F 3/1238* (2013.01)

(56) References Cited

U.S. PATENT DOCUMENTS

| | | | |
|---|---|---|---|
| 2014/0130117 A1* | 5/2014 | Jeannot | G06F 21/34 726/4 |
| 2015/0334109 A1* | 11/2015 | Kasai | H04L 9/40 358/1.14 |
| 2016/0292550 A1 | 10/2016 | Kawai | |
| 2017/0269884 A1* | 9/2017 | Komatsu | G06F 3/1238 |
| 2023/0091898 A1* | 3/2023 | Ohara | G06F 3/1238 358/1.14 |

* cited by examiner

| SUBSCRIBER IDENTIFIER LID | PASSWORD INFORMATION PW | REGISTRATION IDENTIFIER CID | SUBSCRIPTION IDENTIFIER ZID |
|---|---|---|---|
| LID1 | PW1 | CID1 | ZID1 |
| ⋮ | ⋮ | ⋮ | ⋮ |

| SUBSCRIPTION IDENTIFIER ZID | PLAN PL | DEVICE IDENTIFIER DID | DELIVERY DESTINATION ADR |
|---|---|---|---|
| ZID1 | PL1 | DID1 | ADR1 |
| ZID1 | PL1 | DID2 | ADR2 |
| ⋮ | ⋮ | ⋮ | ⋮ |

| REGISTRATION IDENTIFIER CID | DEVICE IDENTIFIER DID |
|---|---|
| CID1 | DID1 |
| CID1 | DID2 |
| ⋮ | ⋮ |

| 532 | ONE-TIME CODE OTC | DEVICE IDENTIFIER DID | REGISTRATION DATE & TIME RT |
|---|---|---|---|
| | OTC1 | DID3 | 2021-11-16 17:14:00 |

TERM T (e.g., T = RT + dT)

FIG. 6A

| 633 | ONE-TIME URL OTU | DEVICE IDENTIFIER DID | DELIVERY DESTINATION ADR | EMAIL ADDRESS EAD |
|---|---|---|---|---|
| | OTU1 | DID3 | ADR3 | EAD1 |

FIG. 6B

| 632 | SUBSCRIPTION ZID | PLAN PL | DEVICE IDENTIFIER DID | DELIVERY DESTINATION ADR |
|---|---|---|---|---|
| | ZID1 | PL1 | DID1 | ADR1 |
| | ZID1 | PL1 | DID2 | ADR2 |
| R1 → | ZID1 | PL1 | DID3 | ADR3 |
| | ⋮ | ⋮ | ⋮ | ⋮ |

FIG. 6C

| 531 | REGISTRATION IDENTIFIER CID | DEVICE IDENTIFIER DID |
|---|---|---|
| | CID1 | DID1 |
| | CID1 | DID2 |
| R2 → | CID1 | DID3 |
| | ⋮ | ⋮ |

| REGISTRATION IDENTIFIER CID | DELIVERY DESTINATION ADR | EMAIL ADDRESS EAD |
|---|---|---|
| CID2 | ADR3 | EAD1 |

| REGISTRATION IDENTIFIER CID | PIN |
|---|---|
| CID2 | PIN1 |

| REGISTRATION IDENTIFIER CID | DEVICE IDENTIFIER DID |
|---|---|
| CID2 | DID3 |

| ONE-TIME URL OTU | DEVICE IDENTIFIER DID | DELIVERY DESTINATION ADR | EMAIL ADDRESS EAD |
|---|---|---|---|
| OTU1 | DID3 | ADR3 | EAD1 |

FIG. 9D

| 632 ↘ SUBSCRIPTION ZID | PLAN PL | DEVICE IDENTIFIER DID | DELIVERY DESTINATION ADR |
|---|---|---|---|
| ZID1 | PL1 | DID1 | ADR1 |
| ZID1 | PL1 | DID2 | ADR2 |
| R1 → ZID1 | PL1 | DID3 | ADR3 |
| ⋮ | ⋮ | ⋮ | ⋮ |

FIG. 9E

| 531 ↘ REGISTRATION IDENTIFIER CID | DEVICE IDENTIFIER DID |
|---|---|
| CID1 | DID1 |
| CID1 | DID2 |
| R2 → CID1 | DID3 |
| ⋮ | ⋮ |

FIG. 9F

SERVER AND NON-TRANSITORY COMPUTER-READABLE RECORDING MEDIUM FOR COMMUNICATION SYSTEM

REFERENCE TO RELATED APPLICATIONS

This application claims priority from Japanese Patent Application No. 2022-026135 filed on Feb. 22, 2022. The entire content of the priority application is incorporated herein by reference.

BACKGROUND ART

The present disclosures relate to a technique for managing a communication system.

Communication devices such as printers and scanners are typically configured to communicate with other communication devices via networks. For managing such a communication device, a server can be used. For example, there is known a conventional communication system having a PC (personal computer), an information management server and a printer. In such a communication system, the PC requests the information management server to issue a PIN code. Then, the information management server issues the PIN code, and transmits code display information for displaying the PIN code on a display to the PC. On a display of a printer connected to the PC, a code registration screen is displayed. The printer then transmits code information related to the PIN code filled out in an input field of the code registration screen as well as a model name and a serial number of the printer to the information management server. When receiving the code information, the serial number and the model name, the information management server extracts account data including the PIN code corresponding to the code information from a data storage area, and stores the extracted account data in association with the serial number and the model name as printer information in the data storage area.

DESCRIPTION

The communication devices may be used in various situations. For example, a user of a communication device could be an administrator thereof. In such a case, the management of the communication devices needs to be improved.

According to aspects of the present disclosures, there is provided a server of a communication system including a terminal device, a communication device and an administrator's device, the server comprising a communication interface, and a controller including hardware, the server being communicative with the terminal device, the communication device and the administrator's device via the communication interface. The controller is configured to perform first obtaining a notification destination that is a notification destination for an administrator of the communication device from a first device which is one of the terminal device and the communication device, second obtaining a first request indicating a request for information to use the communication device from a second device which is another one of the terminal device and the communication device, first associating the notification destination, authentication information that is information required to use the communication device, and identification information of the communication device, first transmitting the authentication information to the second device via the communication interface, third obtaining the authentication information from a third device which is one of the terminal device and the communication device and different from the second device, the authentication information obtained from the third device is information transmitted by the third device based on the authentication information received by the second device, second transmitting a second request indicating a request for administrator information to identify the administrator to the notification destination associated with the authentication information obtained from the third device, fourth obtaining a response transmitted by the administrator's device based on the second request and containing the administrator information, and second associating the administrator information with the identification information of the communication device.

According to aspects of the present disclosures, there is provided a non-transitory computer-readable recording medium for a computer configured to communicate with a terminal device, a communication device and an administrator's device, the recording medium containing computer-executable instructions which cause, when executed by the computer, the computer to perform first obtaining a notification destination that is a notification destination for an administrator of the communication device from a first device which is one of the terminal device and the communication device, second obtaining a first request indicating a request for information to use the communication device from a second device which is another one of the terminal device and the communication device, first associating the notification destination, authentication information that is information required to use the communication device, and identification information of the communication device, first transmitting the authentication information to the second device via the communication interface, third obtaining the authentication information from a third device which is one of the terminal device and the communication device and different from the second device, the authentication information obtained from the third device is information transmitted by the third device based on the authentication information received by the second device, second transmitting a second request indicating a request for administrator information to identify the administrator to the notification destination associated with the authentication information obtained from the third device, fourth obtaining a response transmitted by the administrator's device based on the second request and containing the administrator information, and second associating the administrator information with the identification information of the communication device.

FIG. 2A shows an example of a registration table.

FIG. 2B shows an example of a delivery table.

FIG. 2C shows an example of a device table.

FIG. 6A shows an example of a temporary device table.

FIG. 6B shows an example of a temporary delivery table.

FIG. 6C shows an example of an updated delivery table.

FIG. 6D shows an example of an updated device table.

FIG. 9A shows an example of a temporary delivery table.

FIG. 9B shows an example of a temporary device table.

FIG. 9C shows an example of an updated temporary device table.

FIG. 9D shows an example of an updated temporary delivery table.

FIG. 9E shows an example of an updated delivery table.
FIG. 9F shows an example of an updated device table.

A. EMBODIMENT

A1. System Configuration

Figure 1:
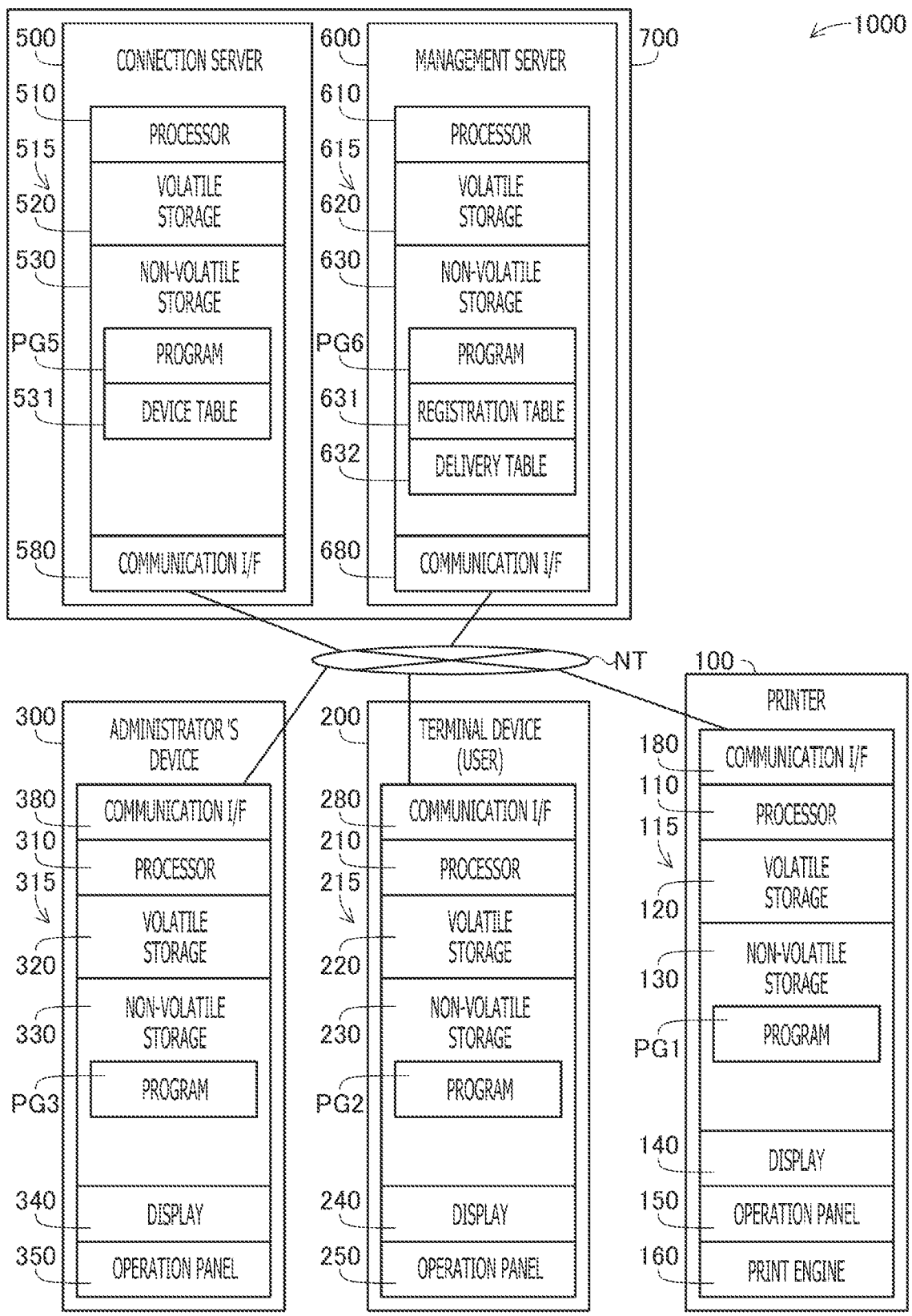
FIG. 1 is a block diagram of a communication system according to the present disclosures.

FIG. 1 is a block diagram showing a system configuration of a communication system 1000. The communication system 1000 includes a printer 100, a terminal device 200, an administrator's device 300, and a communication process server system 700. The communication process server system 700 includes a connection server 500 and a management server 600. In the following description, the communication process server system 700 may be simply referred to as a "processing server" 700. According to the present embodiment, the processing server 700 is provided by a printing service provider. The printing service provider provides the printers 100 to subscribers of the printing service.

The management server 600 manages services associated with the printer 100. According to the present embodiment, the management server 600 is configured to manage the delivery of consumables used by the printer 100. The printer 100 has a print engine 160. The print engine 160 is a printing device configured to print an image using a printing material (e.g., toner or ink) on a sheet (which is an example of a printing medium) using a particular printing method (e.g., a laser or inkjet printing method). In the present embodiment, it is assumed that the print engine 160 is a printing device employing the inkjet printing method using ink. The management server 600 performs a process of delivering refill ink to a delivery destination that is associated with the printer 100 in advance. For example, the management server 600 transmits, to a distributor server (not shown), instructions for shipping ink to the delivery destination. The distributor server will proceed with an ink shipment procedure according to the instructions. The management server 600 may perform the process for ink delivery in response to an order from a user of the printer 100. Alternatively, the management server 600 may obtain the remaining amount of ink from the printer 100 and perform the process for the ink delivery when the remaining amount is low.

The printing services that a subscriber can subscribe to may include a variety of services, such as a subscription service that allows the subscriber to print up to a designated number of copies each month. When a subscription service is subscribed, the management server 600 may assign a new number of printable sheets to the printer 100 each month. The printer 100 allows the user to print up to the above number of printable sheets.

The connection server 500 establishes a continuous connection with the printer 100. Any method of maintaining the continuous connection may be used. For example, the connection server 500 and the printer 100 establish a communication session for the continuous connection according to an XMPP (Extensible Messaging and Presence Protocol). The communication between the printer 100 and the management server 600 is performed via the connection server 500.

The administrator's device 300 is a terminal device of the administrator of the printer 100, and is, for example, a computer (e.g., a smartphone, a personal computer, or the like). The administrator of the printer 100 may be any of various types of people. When the printer 100 is used in a home, the administrator of the printer 100 could be a member of the family (e.g., a father, a mother or the like). When a company subscribes to the printing service, the administrator may be an employee.

The terminal device 200 is a terminal device of a user of the printer 100, and is, for example, a computer (e.g., a smartphone, a personal computer or the like). The user of the printer 100 may be any of various types of people. The user of the printer 100 may be different from the administrator of the printer 100. For example, when the printer is used in a home, the user may be a member (e.g., a child) different from the administrator. When a company subscribes to the printing service, the user may be an employee different from the administrator. When the user works from home, the printer 100 may be installed at the home of the user, not an office.

In the present embodiment, the user of the printer 100 registers the printer 100 in the management server 600 so as to be managed by the management server 600. The management server 600 accepts the registration of the printer 100 with the approval of the administrator. As will be described, the processing server 700 uses authentication information so that the printer 100 can be registered easily, even if the user is different from the administrator.

The devices 100, 200, 300, 500 and 600 are connected to a network NT. The network NT may include the so-called Internet. Further, the network NT may include a so-called a local area network.

The printer 100 has a processor 110, a storage 115, a display 140, an operation panel 150, a print engine 160 and a communication interface 180. These components are interconnected via a bus, as used in well-known devices. The storage 115 includes a volatile storage 120 and a non-volatile storage 130. The processor 110 is a device (e.g., a CPU) configured to perform data processing. The volatile storage 120 is, for example, a DRAM, and the non-volatile storage is, for example, a flash memory.

The display 140 is a device configured to display images, and is, for example, a liquid crystal display, an organic EL display, an LED display or the like. The operation panel 150 is configured to receive user operations and includes, for example, buttons, levers, and a touch panel overlaid on the display 140. The communication interface 180 is an interface configured to communicate with other devices. For example, the communication interface 180 may include at least one of a USB interface, a wired LAN interface, and a wireless interface compliant with IEEE 802.11 standards. According to the present embodiment, the communication interface 180 is connected to the network NT.

The non-volatile storage 130 contains a program PG1. The program PG1 has been stored in the non-volatile storage 130 in advance as firmware by a manufacturer of the printer 100. The processor 110 performs various processes by executing the program PG1.

The terminal devices 200 and 300 have processors 210 and 310, storages 215 and 315, displays 240 and 340, operation panels 250 and 350, and communication interfaces 280 and 380, respectively. In each of the terminal devices 200 and 300, respective components are interconnected via a conventionally-known bus. The storages 215 and 315 include volatile storages 220 and 320, and non-volatile storages 230 and 330, respectively. The processors 210 and 310 are devices configured to perform data processing, and are, for example, CPUs, respectively. The volatile storages 220 and 320 are, for example, DRAMs and the non-volatile storages 230 and 330 are, for example, flash memories.

The displays 240 and 340 are devices configured to display images and are, for example, liquid crystal displays, organic EL displays, LED displays or the like. The operation panels 250 and 350 are devices configured to receive user operations and are, for example, buttons, levers, and touch panels overlaid on the displays 240 and 340, respectively. The communication interfaces 280 and 380 are interfaces to communicate with other devices. For example, each of the communication interfaces 280 and 380 includes at least one of a USB interface, a wired LAN interface, and a wireless interface compliant with the IEEE 802.11 standard. According to the present embodiment, the communication interfaces 280 and 380 are connected to the network NT.

The non-volatile storages 230 and 330 contain programs PG2 and PG3 for the operations of the terminal devices 200 and 300, respectively. The processors 210 and 310 perform various processes (described later) in accordance with the programs PG2 and PG3, respectively.

The servers 500 and 600 have processors 510 and 610, storages 515 and 615, and communication interfaces 580 and 680, respectively. In the server 500, the processor 510, the storage 515, and the communication interface 580 are connected with each other via a bus, and in the server 600, the processor 610, the storage 615, and the communication interface 680 are connected with each other via a bus. The storages 515 and 615 include volatile storages 520 and 620, and non-volatile storages 530 and 630, respectively. Each of the processors 510 and 620 is a device configured to perform a data processing and is, for example, a CPU. Each of the volatile storages 520 and 620 is, for example, a DRAM. Each of the non-volatile storages 530 and 630 is, for example, a flash memory. Each of the communication interfaces 580 and 680 is an interface configured to communicate with another device. For example, each of the communication interfaces 580 and 680 includes at least one of a USB interface, a wired LAN interface, and a wireless interface compliant with the IEEE802.11 standard. According to the present embodiment, each of the communication interfaces and 580 and 680 is connected to the network NT.

The non-volatile storages 530 and 630 store, in advance, programs PG5 and PG6 for the operations of the servers 500 and 600, respectively. The processors 510 and 610 perform various processes in accordance with the programs PG5 and PG6, respectively.

The non-volatile storage 530 of the connection server 500 further includes data indicating a device table 531. The non-volatile storage 630 of the management server 600 is further configured to store data indicating a registration table 631, and a delivery table 632. The registration table 631 and the delivery table 632 will be described later.

A2. Configuration of Tables

FIG. 2A shows an example of the registration table 631. The registration table 631 indicates information related to subscriptions having been registered. In the present embodiment, the registration table 631 indicates a relationship among a subscriber identifier LID, password information PW, a registration identifier CID, and a subscription identifier ZID. The subscriber identifier LID is an identifier of the subscriber of the printing service. The password information PW is information to be used for a password authentication to sign in to a webpage for management (e.g., a hashed value of a password). The registration identifier CID is an identifier of subscription registration. As will be described later, the registration identifier CID is shared by the management server 600 and the connection server 500. The subscription identifier ZID is an identifier of a subscription to the registered printing service. The printing service provider registers information about the subscription in the registration table 631 in response to the subscriber's subscription to the printing service. In an example shown in FIG. 2A, the relationship among a first subscriber identifier LID1, first password information PW1, a first registration identifier CID1, and a first subscription identifier ZID1 has been registered.

FIG. 2B shows an example of the delivery table 632. The delivery table 632 shows a relationship among the subscription identifier ZID, a plan PL, a device identifier DID, and a delivery destination ADR. The subscription identifier ZID is the same as the subscription identifier ZID in the registration table 631 (see FIG. 2A). The plan PL is an identifier of a content of the subscription (e.g., a fixed price service). The device identifier DID is an identifier of a printer (e.g., the printer 100). The delivery destination ADR indicates a delivery destination, which is typically an address where the printer 100 is placed) of consumables. The management server 600 registers information related to a newly registered printer in the delivery table 632 in the registration process. The subscription identifier ZID and the plan PL are determined by the printing service provider in response to the subscription of the printing service by the subscriber. The device identifier DID is determined in advance for each printer. The delivery destination ADR is determined by the user of the printer. The delivery destination ADR is an example of device information to be associated with the printer 100.

In the example shown in FIG. 2B, the information ZID1, PL1, DID1, and ADR1 related to the first device identifier DID1 and the information ZID1, PL1, DID2, and ADR2 related to the second device identifier DID2 have been registered. The first subscription identifier ZID1 and the first plan PL1 are common to the two device identifiers DID1 and DID2. By the registration table 631 (see FIG. 2A), the first subscription identifier ZID1 is associated with the first subscriber identifier LID1. In the example shown in FIGS. 2A and 2B, two printers respectively corresponding to the two device identifiers DID1 and DID2 are associated with the single first subscriber identifier LID1.

FIG. 2C shows an example of the device table 531. The device table 531 shows a relationship between the registration identifier CID and the device identifier DID. The information in the device table 531 is registered in the registration process described later. In the example shown in FIG. 2C, a relationship between a first registration identifier CID1 and a first device identifier DID1 and a relationship between the first registration identifier CID1 and a second device identifier DID2 have been registered.

A3. Registration Process

Figure 3:
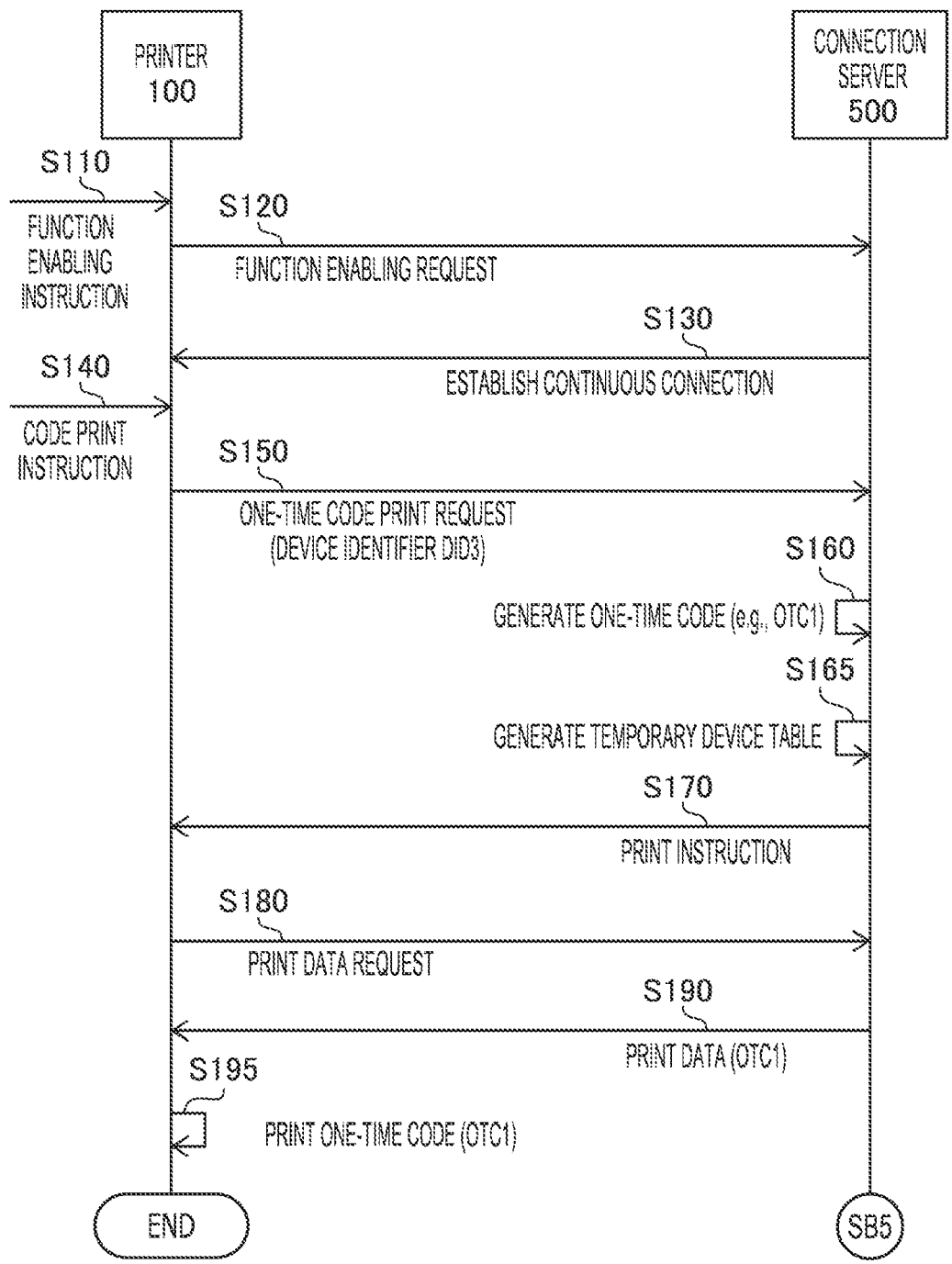
FIGS. 3-5 are sequence diagrams illustrating a registration process according to an embodiment.
Figure 4:
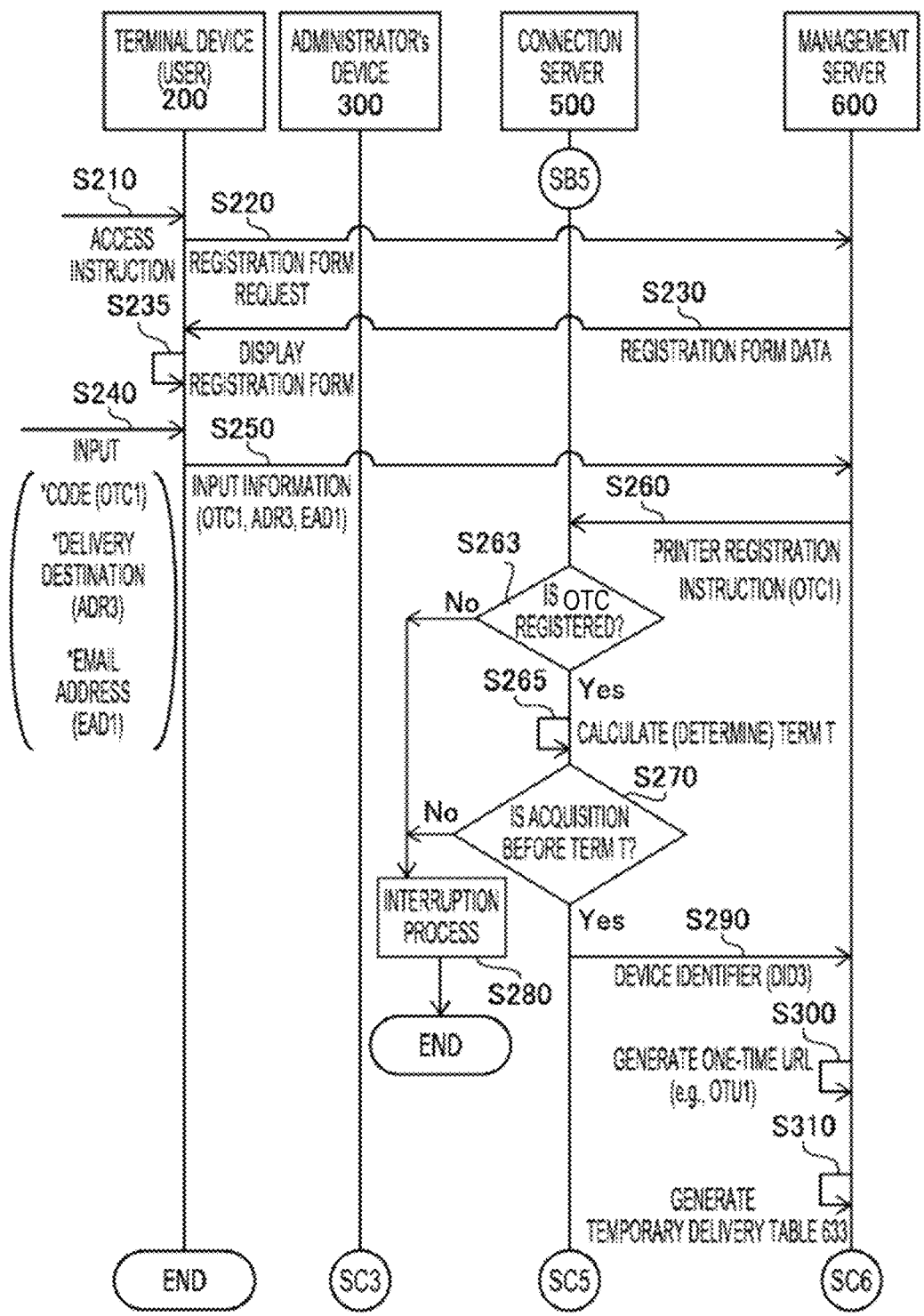
Figure 5:
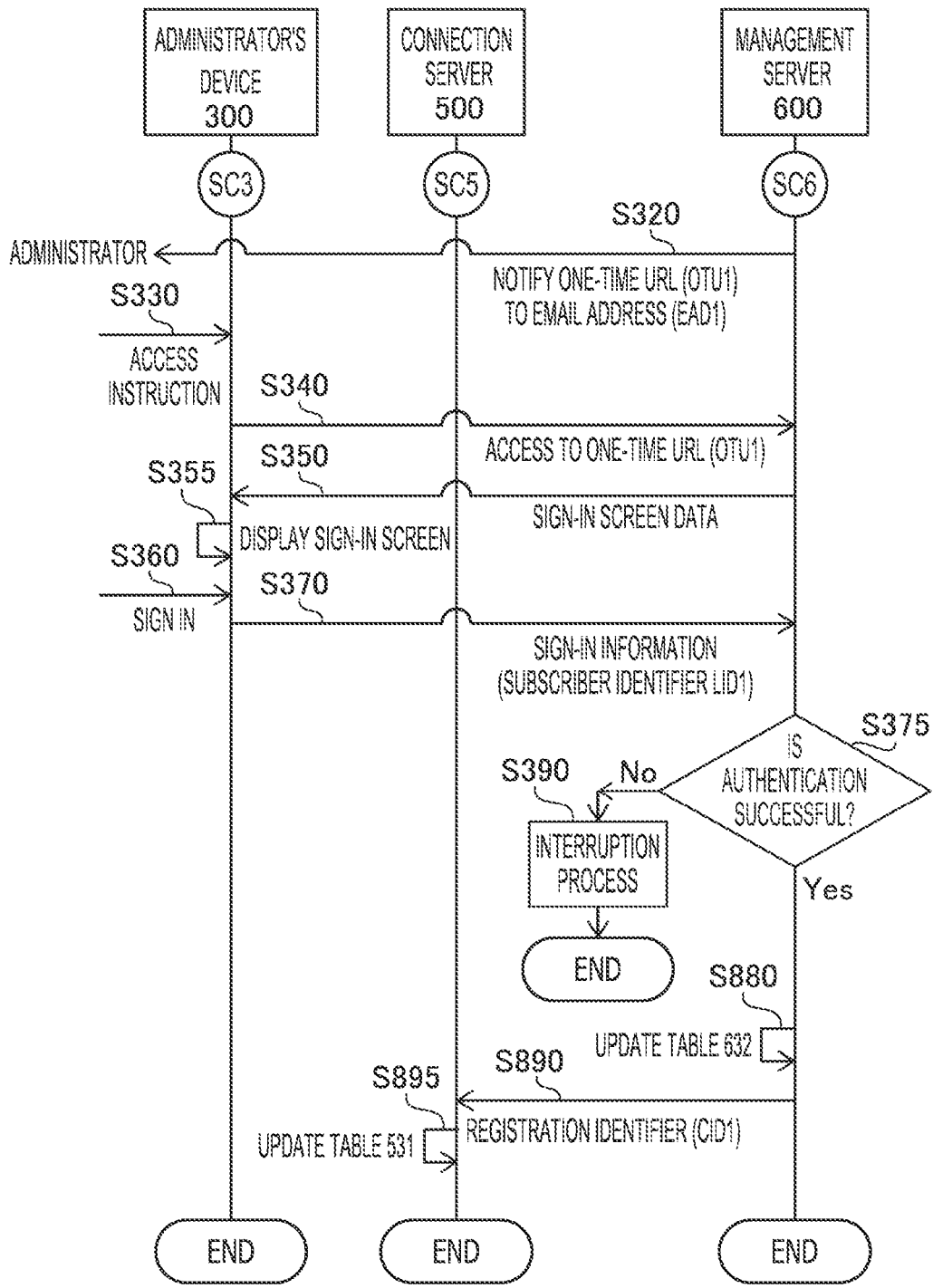

FIGS. 3-5 are sequence diagrams showing an embodiment of the registration process. The registration process proceeds in the order of FIGS. 3, 4 and 5. The registration process registers information related to the printer 100 with the processing server 700. FIGS. 3-5 show the processes of the devices 100, 200, 300, 500, and 600, respectively. The processors 110, 210, 310, 510 and 610 of the devices 100, 200, 300, 500 and 600 execute the corresponding processes of the devices 100, 200, 300, 500 and 600 by executing the programs PG1, PG2, PG3, PG5 and PG6, respectively.

In S110 (FIG. 3), the user inputs an instruction to enable the printing function by operating the operation panel 150 of the printer 100. In the present embodiment, the enablement of the printing function includes an establishment of a continuous connection between the printer 100 and the connection server 500, and a registration of information related to the printer 100 with the processing server 700. In S120, the processor 110 of the printer 100 transmits a request for function enablement to the connection server 500, according to the instruction. In S130, the processor 510 of the connection server 500 executes a process of establishing the continuous connection. In this way, the continuous connection between the connection server 500 and the printer 100 is established.

In S140, the user inputs an instruction to print a one-time code by operating the operation panel 150 of the printer 100. In S150, the processor 110 of the printer 100 transmits a request for printing the one-time code to the connection server 500. This request includes data indicating the device identifier that is the identifier of the printer 100. Hereinafter, it is assumed that the device identifier of the printer 100 is a third device identifier DID3. It is noted that, according to the present embodiment, the data indicating the third device identifier DID3 has been stored in the non-volatile storage device 130 of the printer 100 in advance.

In S160, the processor 510 of the connection server 500 generates the one-time code in response to the request. The one-time code is an example of the authentication information that is used in the authentication. In the present embodiment, the one-time code is a combination of multiple characters such as numerals and/or alphabets. According to the present embodiment, the processor 510 uses random numbers to randomly generate a combination of multiple characters (i.e., the one-time code). In the following description, it is assumed that the one-time code as generated is a first one-time code OTC1.

In S165, the processor 150 generates a temporary device table 532. FIG. 6A schematically shows an example of the temporary device table 532. In the present embodiment, the temporary device table 532 shows the relationship between the one-time code OTC, the device identifier DID, and the registration date and time RT. The one-time code OTC is the one-time code generated in S160. The device identifier DID is the device identifier obtained in S150. The processor 510 registers a combination of the information DID3 and OTC1 obtained in S150 and S160 in the temporary device table 532. The registration date and time RT is the date and time when the information DID and OTC are registered. The processor 510 obtains the current date and time by referring to a timer provided in the connection server 500 (not shown), and registers the obtained current date and time as the registration date and time RT in the temporary device table 532. In the present embodiment, the registration date and time RT is represented by year, month, hour, and minute. As described below, the registration date and time RT are used to calculate the expiration date T of the one-time code OTC. The processor 510 stores data indicating the temporary device table 532 in the storage 515 (e.g., non-volatile storage device 530).

In S170 (FIG. 3), the processor 510 of the connection server 500 transmits a print instruction to the printer 100. In S180, the processor 110 of the printer 100 transmits a request for the print data to the connection server 500 in response to the print instruction. In S190, the processor 510 of the connection server 500 generates the print data for printing the one-time code (in this case, the first one-time code OTC1). The data format of the print data may be any data format suitable for the printer 100. The processor 510 transmits the generated print data to the printer 100. In S195, the processor 110 of the printer 100 controls the print engine 160 according to the received print data. The print engine 160 prints the first one-time code OTC1.

In S210 (FIG. 4), the user enters an access instruction to the registration form by operating the operation panel 250 of the terminal device 200. The method of inputting the access instructions may be any method. For example, the user may enter the URL (Uniform Resource Locator) of the registration form to a browser running on the terminal device 200. The URL of the registration form is determined in advance. In S220, the processor 210 of the terminal device 200 transmits the request for the registration form to the management server 600 by accessing the URL of the registration form. In the present embodiment, the registration form is a web form for entering information. Furthermore, the program PG2 of the terminal device 200 is a web browser program.

In S230, the processor 610 of the management server 600 transmits the data of the registration form to the terminal device 200. In S235, the processor 210 of the terminal device 200 displays the registration form on the display 240 according to the data received. The registration form displayed on the display 240 is an example of an input screen for entering information.

In S240, the user inputs information for registration by operating the operation panel 250 of the terminal device 200. In the present embodiment, the information input includes the one-time code, a delivery destination of consumables, and an email address of an administrator. The user inputs the one-time code (i.e., the first one-time code OTC1) printed in S195 (FIG. 3). Further, it is assumed that the third delivery destination ADR3 is input as the delivery destination, and the first email address EADS is input as the email address. The email address of the administrator is provided to the user in advance. The method of providing the email address may be any method. For example, electronic providing methods, such as email, posting on electronic bulletin boards that can only be viewed by interested parties, and the like may be employed. Alternatively, a physical method of providing such as mailing paper documents may be employed. In either case, the method of providing should be configured in such a way that it is difficult for a third party to obtain the email address. In S250, the processor 210 of the terminal device 200 transmits data indicating the input information OTC1, ADR3, and EAD1 to the management server 600.

In S260, the processor 610 of the management server 600 transmits an instruction to register the printer to the connection server 500. This instruction contains data indicating the one-time code OTC1.

In S263, the processor 510 of the connection server 500 determines whether the received one-time code has been registered in the temporary device table 532 (FIG. 6A). When the one-time code has not been registered in the temporary device table 532 (S263: NO), the processor 510 determines that the authentication is failed, and executes an interrupting process of registering the printer 100. Then, the processor 510 terminates the registration process. The interrupting process could be any of various processes. For example, the interrupting process may include a process of notifying an interruption to the management server 600.

When the one-time code has been registered in the temporary device table 532 (S263: YES), the processor 510 of the connection server 500 determines an effective date of the one-time code OTC1 included in the received registration instruction. In the present embodiment, the processor 510 calculates an effective term T by adding a particular effective time dT (e.g., 24 hours) to the registration data and time RT (see FIG. 6A).

In S270, the processor 510 determines whether the date and time of acquisition of the one-time code OTC1 from the terminal device 200 is before the effective term T. In the present embodiment, the process of S260-S265 is finished within a relatively short period of time. Therefore, the processor 510 uses the current date and time obtained by referring to a timer (e.g., a built-in timer) as the date of time of acquisition of the one-time code OTC1.

When the acquisition date and time of the one-time code OTC1 is equal to or after the effective term T (S270: NO), the processor 510 determines that the authentication is failed, and executes the interruption process of the registration of the printer 100 (S280). Then, the processor 510 terminates the registration process.

When the date and time of the acquisition of the one-time code OTC1 is before the effective date (S270: YES), the processor 510 determines that the authentication is successful, and data indicating the device identifier DID3 to the management server 600.

In S300, the processor 610 of the management server 600 generates a one-time URL, which is also referred to as a one-time locator in the following description. The one-time URL is a URL to which an administrator should have access for authorization. The one-time URL indicates a web page provided by the management server 600. The one-time URL will be determined to be a different URL for each registration process. For example, the processor 610 uses random numbers to generate a combination of multiple characters and adopts a URL containing the generated combination of multiple characters as a one-time URL. In the following description, it is assumed that the generated one-time locator (i.e., the one-time URL) is a first locator OTU1.

In S310, the processor 610 generates the temporary delivery table 633. FIG. 6B shows an example of the temporary delivery table 633. In the present embodiment, the temporary delivery table 633 shows the relationship among the one-time URL OTU, the device identifier DID, the delivery destination ADR, and the email address EAD. The one-time URL (one-time locator) OTU is the one-time locator generated in S300. The device identifier DID is the device identifier obtained in S290. The delivery destination ADR and the email address EAD are the delivery destination and the email address obtained in S250. The processor 610 registers the relationships among the first locator OTU1, the third device identifier DID3, the third delivery destination ADR3, and the first email address EAD1 in the temporary delivery table 633. The processor 610 stores the data representing the temporary delivery table 633 in the storage 615 (e.g., the non-volatile storage 630).

In S320 (FIG. 5), the processor 610 obtains the email address that corresponds to the one-time code obtained from the terminal device 200 in S250 (FIG. 4). In the present embodiment, a set of the one-time code OTC1 and the first email address EAD1 is obtained in S250. Therefore, the first email address EAD1 is the email address that is associated with the one-time code OTC1. The processor 610 transmits an email containing data indicating the one-time URL generated in S300 (in this case, the first locator OTU1) to the administrator's email address (in this case, the first email address EAD1). In this way, the processor 610 notifies the administrator of the one-time URL using an email. The email contains, for example, text data indicating the one-time URL.

In S330, the administrator enters an instruction for accessing the one-time URL by operating the operation panel 350 of the administrator's device 300. A method of inputting the access instruction may be any method. For example, when an administrator is viewing emails on the display 340 of the administrator's device 300, the administrator can enter the access instruction for the browser by operating (e.g., tapping or clicking) on a one-time URL indicated by the email. Alternatively, the administrator may enter the access instruction by directly entering the one-time URL to the browser running on the administrator's device 300. In the present embodiment, the program PG3 of the administrator's device 300 is a program for the web browser.

In S340, the processor 310 of the administrator's device 300 transmits an access request for the one-time URL to the management server 600.

In S350, the processor 610 of the management server 600 transmits data indicating the web page corresponding to the one-time URL to the administrator's device 300. In the present embodiment, this web page indicates the administrative sign-in screen. In S355, the processor 310 of the administrator's device 300 displays a sign-in screen on the display 340 using the received data. In the present embodiment, the sign-in screen is configured so that a subscriber identifier and a password are entered for password authentication. The sign-in authentication method is not limited to the password authentication, but may be any other authentication method.

In S360, the administrator enters the subscriber identifier (in this case, the first subscriber identifier LID1) and the password by operating the operation panel 350 of the administrator's device 300. The administrator is informed in advance by the subscriber of the first subscriber identifier LID1 and the password to manage the printer. The first subscriber identifier LID1 is an example of administrative information that identifies an appropriate administrator. In S370, the processor 310 of the administrator's device 300 transmits data indicating the entered information to the management server 600.

In S375, the processor 610 of the management server 600 refers to the information from the administrator's device 300 and the registration table 631 (FIG. 2A) to determine whether the authentication is successful or not. When the authentication is failed (S375: NO), in S390, the processor 610 executes the interruption process of the registration of the printer 100. Then, the processor 610 terminates the registration process. The interruption process may be any of various processes. For example, the interruption process may include a process of notifying an interruption to the connection server 500.

When the authentication is successful (S375: YES), in S880, the processor 610 updates the delivery table 632. FIG. 6C illustrates an example of an updated delivery table 632. This delivery table 632 shows the table updated from the delivery table 632 shown in FIG. 2B. As shown in FIG. 6C, the first relationship R1 has been added. The processor 610 determines the information ZID, PL, DID, and ADR of the first relationship R1 as follows.

The subscription identifier ZID and the plan PL are determined to be those (here, the first subscription identifier ZID1 and the first plan PL1) which have already been associated with the subscriber identifier LID (here, the first subscriber identifier LID1) that is obtained in S370 (FIG. 5). The relationship among the subscriber identifier LID, the subscription ZID, and the plan PL is indicated by the registration table 631 (FIG. 2A) and the delivery table 632 (FIG. 2B). The registration table 631 may further indicate the plan PL. The plan PL in the registration table 631 may have been registered in the registration table 631 in response to the subscriber's subscription to the printing service. The device identifier DID and the delivery destination ADR are obtained from the temporary delivery table 633 (FIG. 6B). That is, the device identifier DID is determined to be the device identifier obtained in S290 (FIG. 4) (here, the third device identifier DID3). The delivery destination ADR is determined to be the delivery destination obtained in S250

(FIG. 4). In this case, the delivery destination ADR is determined to be the third delivery destination ADR3.

The updated delivery table 632 (FIG. 6C) and the registration table 631 (FIG. 2A) associate the subscriber identifier LID with the device identifier DID via the subscription identifier ZID. The processor 610 associates the subscriber identifier LID with the device identifier DID by updating the delivery table 632.

In S890 (FIG. 5), the processor 610 transmits data indicating the registration identifier CID to be associated with the newly registered first relationship R1 to the connection server 500. The processor 610 refers to the registration table 631 (FIG. 2A) to obtain the registration identifier CID that is associated with the subscription identifier ZID of the first relationship R1 (in this case, the first registration identifier CID1 to be associated with the first subscription identifier ZID1).

In S895, the processor 510 of the connection server 500 updates the device table 531 using the received registration identifier CID. FIG. 6D schematically shows an example of the updated device table 531. This device table 531 shows a table updated from the device table 531 shown in FIG. 2C. As shown in FIG. 6D, in the updated device table 531, the second relationship R2 has been added. The processor 510 determines the registration identifier CID of the second correspondence R2 is to be the first registration identifier CID1 obtained in S890 (FIG. 5). The processor 510 determines the device identifier DID in the second relationship R2 to be the third device identifier DID3, which is associated with the one-time code OTC1 obtained in S260 (FIG. 4) through the temporary device table 532 (FIG. 6A). Then, the registration process is terminated.

In the present embodiment, the processes of S330 and S360 (FIG. 5) by the administrator indicate the approval of the registration of the printer 100 by the administrator. The information notified to the administrator in S320 may include the identification of the printer (e.g., the device identifier DID) in addition to the one-time URL. When the administrator does not approve the registration of the printer indicated by the notified identification information, S330 and S360 do not have to be performed. In such a case, the processes S370 onwards are not executed, and the processing server 700 does not register information related to the printer 100.

As described above, according to the present embodiment, the printer 100 (FIG. 1) is configured to communicate with other devices (e.g., the processing server 700) via the network NT. Such a printer 100 is an example of a communication device (hereinafter, the printer 100 may also be referred to as a communication device 100). The processing server 700 is configured to communicate with the terminal device 200, the communication device 100 and the administrator's device 300. In the present embodiment, the processing server 700 has the connection server 500 and the management server 600. The connection server 500 and management server 600 share some of the functions performed by the communication process server system 700.

The connection server 500 and the management server 600 perform the processes described below. In S250 (FIG. 4), the management server 600 obtains, from the terminal device 200, a notification destination (in this case, the email address EAD1), which is the destination of the notification to the administrator of the communication device 100. In S150 (FIG. 3), the connection server 500 obtains a request for a one-time code from the communication device 100. The one-time code is an example of authentication information, which is information for using the communication device 100. Hereafter, this request for authentication information (in the present embodiment, the one-time code) is also referred to as a first request.

In S165, the connection server 500 associates the one-time code OTC1 with the device identifier DID3 (FIG. 6A). In S310 (FIG. 4), the management server 600 associates the device identifier DID3 with the email address EAD1 (FIG. 6B). The processing server 700 associates the email address EAD1, the one-time code OTC1 and the device identifier DID3 by performing the processes in S165 and S310.

In S190 (FIG. 3), the connection server 500 transmits the one-time code OTC1 to the communication device 100. In S250 (FIG. 4), the management server 600 obtains the one-time code OCT1 from the terminal device 200. The transmission source of the one-time code OTC1 is the terminal device 200 that is, among the communication device 100 and the terminal device 200, a device different from the communication device 100 which is the transmission source of the first request for the one-time code (FIG. 3: S150). The one-time code OTC1 obtained from the terminal device 200 is information the terminal device 200 transmits based on the one-time code OTC1 received by the communication device 100. In the present embodiment, in S195 (FIG. 3), the communication device 100 prints out the received one-time code OTC1. In S240 (FIG. 4), the user observes the one-time code OTC1 printed by the communication device 100, and inputs the one-time code into the terminal device 200. In this way, the one-time code OTC1 is delivered by the user from the communication device 100 to the terminal device 200. The terminal device 200 is configured to receive the one-time code OTC1 that is received by the communication device 100. Concretely, the terminal device 200 is configured to receive the one-time code OTC1 in accordance with an instruction by the user (e.g., the user operation of the operation panel 250).

In S320 (FIG. 5), the management server 600 transmits the one-time URL (in this case, the first locator OTU1) to the email address EAD1 that is associated with the one-time code OTC1 obtained from the terminal device 200 in S250 (FIG. 4). As described with reference to S330-S370 of FIG. 5, the user enters a subscriber identifier (in this case, the first subscriber identifier LID1), which is an example of administrative information identifying the administrator, through the web page corresponding to the first locator OTU1. As such, the first locator OTU1 indicates a request for administrator information. Hereafter, this request for administrator information is also referred to as a second request.

In S370 (FIG. 5), the management server 600 obtains the response transmitted by the administrator's device 300 based on the first locator OTU1. This response contains the administrator's information (in this example, the first subscriber identifier LID1). In S880 (FIG. 5), the management server 600 updates the delivery table 632 (FIG. 6C) to associate the administrator information (here, the first subscriber identifier LID1) with the device identifier DID3 of the communication device 100. In the present embodiment, the first subscriber identifier LID1 and the third device identifier DID3 are associated by means of registration table 631 (FIG. 2A) and the updated delivery table (delivery table) 632 (FIG. 6C).

As mentioned above, in a case where the user of the communication device 100 is different from the administrator of the communication device 100, the processing server 700 can appropriately associate the administrator information (in this case, the first subscriber identifier LID1) with the device identifier DID3 of the communication device 100.

As described referring to FIG. 5, the second request (FIG. 5: S320) for the administrator information (in this case, the subscriber identifier LID) contains data indicating the first locator OTU1, and the data indicating the first locator OTU1 is used to display a sign-in screen on the administrator's device 300 (S355). Then, in S370, the administrator's device 300 transmits a response containing the information entered on the sign-in screen to the management server 600. The administrator information contained in the response indicates the administrator information to be entered in the sign-in screen (in this case, the first subscriber identifier LID1). According to this configuration, the processing server 700 can appropriately associate the administrator information entered on the sign-in screen with the device identifier DID3 of the communication device 100.

As described referring to S240 and S250 (FIG. 4), the destination of the notification for the administrator is the email address of the administrator. Thus, the processing server 700 can appropriately associate the administrator information with the identification information of the communication device by transmitting the second request for the administrator information (in this case, the subscriber identifier LID) to the email address of the administrator.

In S250 (FIG. 4), the management server 600 obtains the delivery destination ADR3 from the terminal device 200. The delivery destination ADR3 is an example of device information that should be associated with the communication device 100. In S880 (FIG. 5), the management server 600 associates the device identifier DID3 of the communication device 100 with the delivery destination ADR3 by updating the delivery table 632 (FIG. 6C). In this way, the processing server 700 can appropriately associate the administrator information with the identification information and the device information of the communication device.

The device information to be associated with the communication device 100 contains the delivery destination ADR of the consumables (in this example, the ink) used by the communication device 100. In this way, the processing server 700 can appropriately associate the administrator information with the identification information of the communication device and the delivery destination.

In S150 (FIG. 3), the connection server 500 obtains the first request, which is a request for authentication information (in this case, the one-time code), from the communication device 100. In S250 (FIG. 4), the management server 600 obtains the one-time code OTC1 from the terminal device 200. The processing server 700 can use the one-time code OTC1 obtained from the terminal device 200 to appropriately associate the management information with the identification information of the communication device.

As shown in FIG. 1, the communication device 100 includes the print engine 160. In S190 (FIG. 3), the connection server 500 transmits data that causes the print engine 160 to print the one-time code, which is an example of authentication information, to the communication device 100. The authentication information obtained from the terminal device 200 in S250 (FIG. 4) indicates the authentication information that is input to the terminal device 200. Therefore, by having the printing engine 160 of the communication device 100 print the authentication information, and by obtaining the authentication information input to the terminal device 200, the processing server 700 can appropriately associate the administrator information with the identification information of the communication device.

In S250 (FIG. 4), the management server 600 obtains the notification destination (in this case, the email address EAD1) from the terminal device 200. Therefore, the processing server 700 can appropriately associate the administrator information with the identification information of the communication device, using the notification destination obtained from the terminal device 200. Further, as described in S240, this notification destination indicates the notification destination to be entered into the terminal device 200. Therefore, the processing server 700 can appropriately associate the administrator information with the identification information of the communication device using the notification destination that is input to the terminal device 200.

In S265 (FIG. 4), the connection server 500 determines the term T for obtaining the one-time code OTC1 from the terminal device 200 (S250). When the one-time code OTCQ is obtained after the term T (S270: NO), the connection server 500 terminates the registration process without executing the process of S290 (i.e., the transmission of the device identifier DID3). That is, the processing server 700 prohibits the transmission of the second request. When the one-time code OTC1 is obtained before the term T (S270: YES), the connection server 500 performs the process of S320. That is, the processing server 700 allows the transmission of the second request. When the time between the generation of authentication information (in this case, the one-time code OTC1) (FIG. 3: S160) and the acquisition of authentication information (FIG. 4: S250) is long, the authentication information may have been improperly acquired. For example, a third party may improperly obtain a printed copy of the one-time code OTC1 and proceed with S240 and S250 in FIG. 4. In the present embodiment, the processing server 700 can reduce the possibility of improper association of the administrator information with other information due to improper acquisition of authentication information. For example, the possibility that an inappropriate combination of administrator information and delivery destination ADRs could be associated can be reduced.

B. MODIFIED EMBODIMENT

Figure 7:
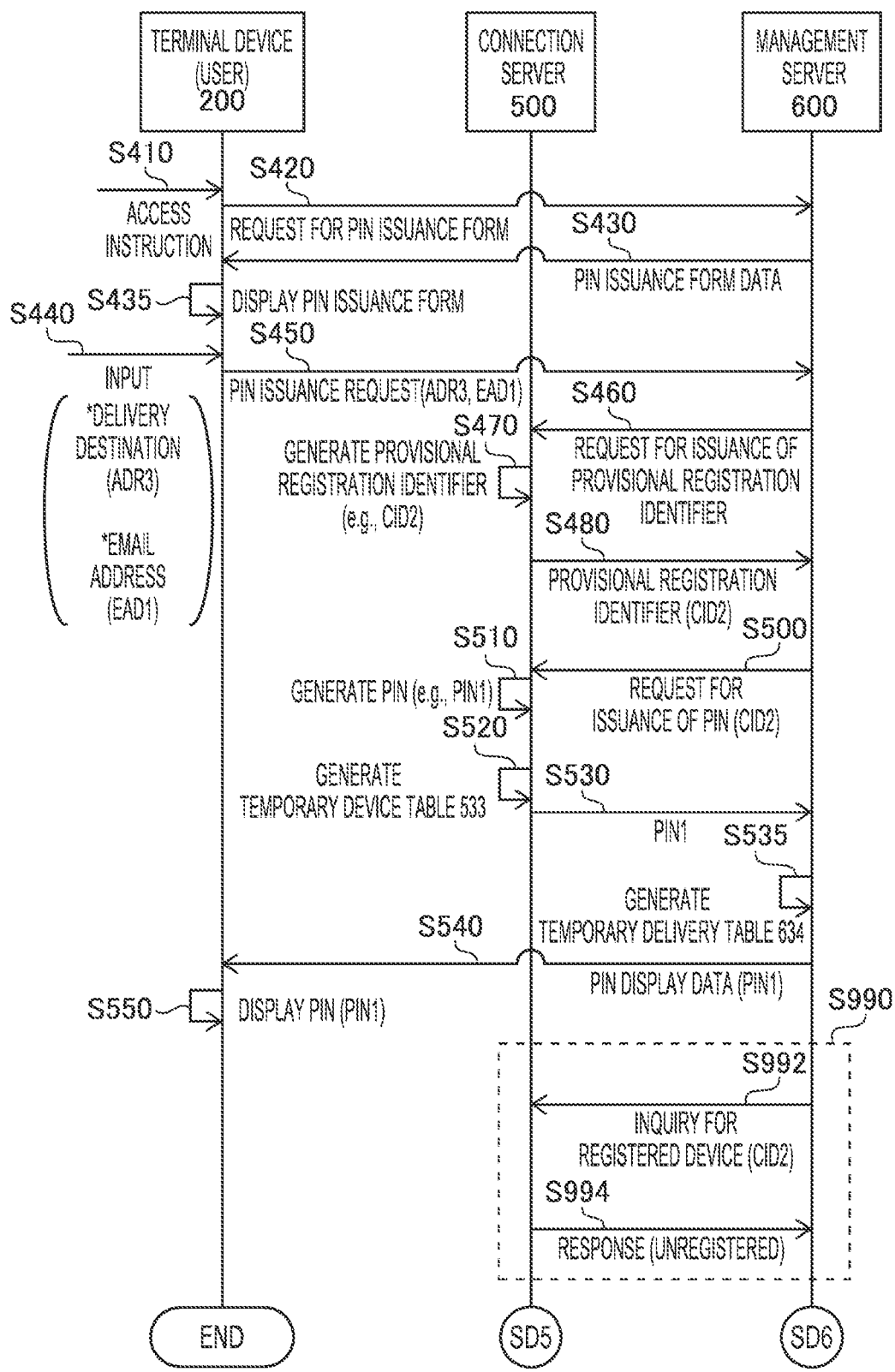
FIGS. 7-8 are sequence diagrams illustrating a registration process according to a modified embodiment.
Figure 8:
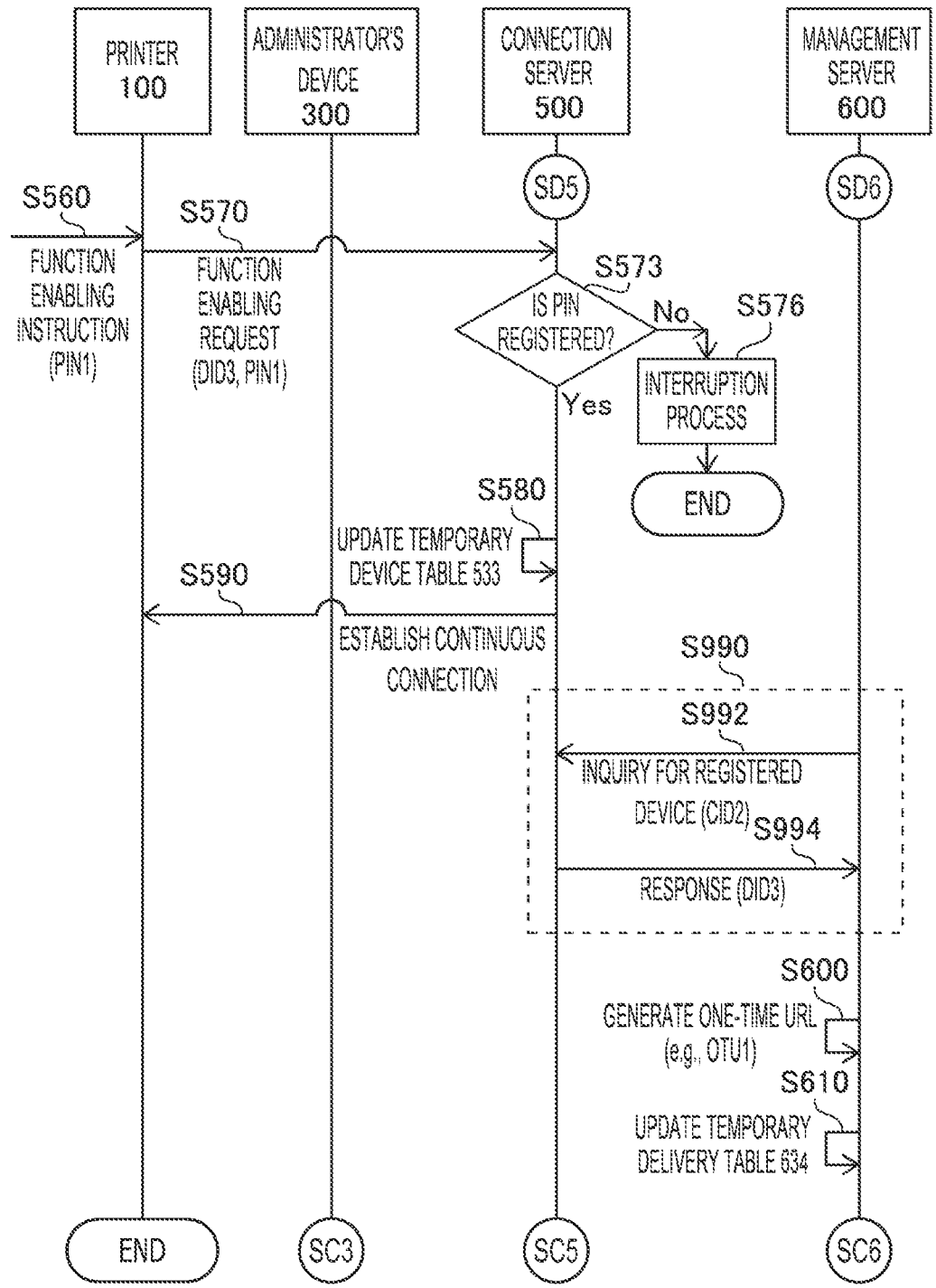

FIGS. 7-8 are sequence diagrams illustrating a registration process according to a modified embodiment of the above-described embodiment. As will be described in detail, according to the modified embodiment, processes are performed in the order of FIGS. 7, 8 and 5 (the process shown in FIG. 5 according to the modified embodiment is the same as the process shown in FIG. 5 in the above-described embodiment). The registration process is performed by the communication system 1000 (FIG. 1) instead of the registration process shown in FIGS. 3-5. In the modified embodiment, instead of the one-time code OTC, a PIN (Personal Identification Number) code is used. In the following description, the PIN code will also be referred to simply as a "PIN." The registration table 631, the delivery table 632, and the device table 531 (FIGS. 2A-2C) are the same as those of the above-described embodiment.

In S410 (FIG. 7), the user of the printer 100 inputs an access instruction to access an issuance form of the PIN by operating the operation panel 250 of the terminal device 200. In the modified embodiment, the user inputs the URL of the issuance form to the browser running on the terminal device 200. The URL of the issuance form has been determined in advance. In S420, the processor 210 of the terminal device 200 accesses the URL of the issuance form, thereby transmitting a request for the issuance form to the management server 600. In the modified embodiment, the issuance form is a web form for allowing the user to input information.

In S430, the processor 610 of the management server 600 transmits data of the issuance form of the PIN to the terminal device 200. In S435, the processor 210 of the terminal device 200 displays the issuance form (not shown) on the display 240 in accordance with the received data. The issuance form displayed on the display 240 is an example of an input screen for the user to input information.

In S440, the user inputs information for issuing the PIN by operating the operation panel 250 of the terminal device 200. In the modified embodiment, the information as input contains the delivery destination of the consumables and the email address of the administrator. In the following description, it is assumed that the third delivery destination ADR3 is input as the delivery destination, and the first email address EAD1 is input as the email address of the administrator. In S450, the processor 210 of the terminal device 200 transmits a PIN issuance request including data indicating the input information ADR3 and EAD1 to the management server 600.

In S460, the processor 610 of the management server 600 transmits an issuance request for a provisional registration identifier to the connection server 500. The provisional registration identifier is a temporary registration identifier CID which is not associated with the subscriber identifier LID (FIG. 2A). As will be described later, when the registration of the printer 100 is allowed, the provisional registration identifier is changed to the registration identifier CID which is associated with the subscriber identifier LID. In S470, the processor 510 of the connection server 500 generates the provisional registration identifier. For example, the processor 510 uses random numbers to generate the provisional registration identifier. It is noted that the provisional registration identifier is determined to be an identifier different from the registration identifier CID that has already been registered in the registration table 631 (FIG. 2A). In the following description, it is assumed that the generated provisional registration identifier is a provisional registration identifier CID2. In S480, the processor 510 transmits data indicating the provisional registration identifier CID2 to the management server 600.

In S500, the processor 610 transmits an issuance request for the PIN to the connection server 500. In S510, the processor 510 of the connection server 500 generates the PIN in response to the request. It is noted that the PIN is an example of authentication information to be used in the authentication described later. In the modified embodiment, the PIN is a combination of a plurality of numbers. The processor 510 randomly generates a combination of a plurality of numbers (e.g., the PIN) using random numbers. In the following description, it is assumed that the generated PIN is a code PIN1.

In S520, the processor 510 generates the temporary device table 533. FIG. 9B shows an example of the temporary device table 533. In the modified embodiment, the temporary device table 533 shows a relationship between the registration identifier CID and the PIN. The registration identifier CID is the provisional registration identifier generated in S470. The PIN is the PIN generated in S510. The processor 510 registers a combination of the information CID2 and PIN1 generated in S470 and S510 in the temporary device table 533. The data indicating temporary device table 533 in the storage 515 (e.g., the non-volatile storage 530).

In S530 (FIG. 7), the processor 510 transmits data indicating the PIN generated in S510 (in this case, the code PIN1) in the management server 600.

In S535, the processor 610 of the management server 600 generates the temporary delivery table 634. FIG. 9A shows an example of the temporary delivery table 634. In the modified embodiment, the temporary delivery table 634 indicates a relationship among the registration identifier CID, the delivery destination ADR and the email address EAD. The registration identifier CID is the provisional registration identifier obtained in S480 (FIG. 7). The delivery destination ADR and the email address EAD are the delivery destination and the email address obtained in S450. The processor 610 registers a combination of the information CID2, ADR3 and EAD1 obtained in S450 in the temporary delivery table 634. The processor 610 stores the data indicating the temporary delivery table 634 in the storage 615 (e.g., the non-volatile storage 630).

In S540, the processor 610 of the management server 600 transmits the display data for displaying the PIN obtained in S530 on the terminal device 200 to the terminal device 200. In the modified embodiment, the display data is data of a web page displaying the PIN.

In S992, the processor 610 transmits an inquiry for the registered device identifier to the connection server 500. The inquiry contains data indicating the provisional registration identifier (in this case, the provisional registration identifier CID2). In S994, the processor 510 of the connection server 500 transmits a response to the inquiry to the management server 600. As will be described, the connection server 500 associates the provisional registration identifier with the device identifier of the printer by validating the printer using the PIN. The registration device identifier indicates the device identifier associated with the provisional registration identifier. As in a case where S994 of FIG. 7 is being executed, the device identifier is not associated with the provisional registration identifier before the printer is validated. In this case, the processor 510 transmits a response indicating that the processor 510 has not been registered to the management server 600. The processor 610 of the management server 600 repeats the inquiry of S992 until a response indicating the registration device identifier is received. In this way, the process S990 including S992 and S994 is repeated.

In S550, the processor 210 of the terminal device 200 displays the PIN on the display 240 using the display data received in S540. The user can recognize the PIN by observing the display 240. In S560 (FIG. 8), the user inputs an enabling instruction of the printing function by operating the operation panel 150 of the printer 100. In this case, the user input the PIN (in this case, the code PIN1) displayed in S550 (FIG. 7). In S570, the processor 110 of the printer 100 transmits a function enabling request for the printer. The function enabling request contains data indicating the PIN input in S560 and the device identifier DID3 of the printer 100.

In S573, the processor 510 of the connection server 500 determines whether the PIN as received has been registered in the temporary device table 533 (FIG. 9B). When the PIN has not been registered in the temporary device table 533, the processor 510 determines that the authentication is failed (S573: NO), and the processor 510 executes an interruption process of the registration of the printer 100 (S576). Then, the processor 510 terminates the registration process. The interruption process may be various processes. For example, the interruption process may include a process of notifying the management server 600 of the interruption.

When the PIN has been registered in the temporary device table 533 (S573: YES), the processor 510 of the connection server 500 updates the temporary device table 533 (S580) using the information received in S570. FIG. 9C shows an example of the updated temporary device table 533. The temporary device table 533 shows the table that has been updated from the temporary device table 533 shown in FIG. 9B. The processor 510 replaces the code PIN1 in the temporary device table 533 (FIG. 9B) before the update with the device identifier DID3, which is associated with the code PIN1 by the information received in S570. As a result, the updated temporary device table 533 (FIG. 9C) shows a relationship between the provisional registration identifier CID2 and the device identifier DID3. As above, the temporary device table 533 indicates whether the device identifier is associated with the provisional registration identifier. When the inquiry in S992 (FIG. 7) is received, the processor 510 may determine the content of the response transmitted in S994 with reference to the temporary device table 533.

In S590 (FIG. 8), the processor 510 establishes the continuous connection with the printer 100.

In S992 after S580, the processor 610 of the management server (management server) 600 inquires the connection server 500 for the registered device identifier. In S994, the processor 510 of the connection server 500 refers to the temporary device table 533 (FIG. 9C) to obtain the device identifier DID3 that is associated with the provisional registration identifier CID2 in the inquiry. Then, the processor 510 transmits a response containing data indicating the device identifier DID3 to the management server 600.

After receipt of the response indicating the registration device identifier (FIG. 8, S994), the processor 610 of the management server 600 generates the one-time URL (i.e., the one-time locator). The process in S600 is the same as the process in S300 of FIG. 4. In the following description, it is assumed that the generated one-time locator is a first locator OTU1.

In S610, the processor 610 updates the temporary delivery table 634. FIG. 9D shows an example of the updated temporary delivery table 634. The temporary delivery table 634 shows a table updated from the temporary delivery table 634 shown in FIG. 9A. The processor 610 adds the one-time URL generated in S600 (in this case, the first locator OTU1) to the temporary delivery table 634 (FIG. 9A) before the update, and replaces, in FIG. 9C, the provisional registration identifier CID2 (FIG. 9A) with the device identifier DID3 obtained in S994 (FIG. 8).

After the process shown in FIG. 8, the process shown in FIG. 5 is performed. The process of FIG. 5 in the modified embodiment is the same as the process of FIG. 5 according to the embodiment (FIGS. 3-5) except that the temporary delivery table 634 (FIG. 9D) is referred to instead of the temporary delivery table 633 (FIG. 6B). In S320, the processor 610 of the management server 600 refers to the temporary delivery table 634 to transmit an email containing data indicating the first locator OTU1 to the email address EAD1. In S330-S370, sign-in is performed.

When the authentication is successful (S375: YES), the processor 610 of the management server 600 updates the delivery table 632 in S880. FIG. 9E schematically shows an example of the updated delivery table 632. The delivery table 632 shows a table updated from the delivery table 632 shown in FIG. 2B. The updated delivery table 632 (FIG. 9E) is the same as the updated delivery table 632 shown in FIG. 6C. The processor 610 determines the device identifier DID as the device identifier DID3 obtained in S994 (FIG. 8), and the delivery destination ADR as the delivery destination ADR3 obtained in S450 (FIG. 7).

The updated delivery table 632 (FIG. 9E) and the registration table 631 (FIG. 2A) associate the subscriber identifier LID with the device identifier DID via the subscription identifier ZID. The processor 610 associates the subscriber identifier LID with the device identifier DID by updating the delivery table 632.

S890 and S895 (FIG. 5) according to the modified embodiment are the same as S890 and S895 according to the embodiment, respectively. FIG. 9F shows an example of the updated device table 531. This device table 531 is a table updated from the device table 531 shown in FIG. 2C. The update device table 531 (FIG. 9F) is the same as the updated device table 531 shown in FIG. 6D. The processor 510 registers a second relationship R2 indicating a relationship between the device identifier DID3 obtained in S570 (FIG. 8) and the first registration identifier CID1 obtained in S890 (FIG. 5) in the device table 531. Then, the registration process is terminated.

As above, according to the modified embodiment, the connection server 500 and the management server 600 execute the processes indicated below. In S450 (FIG. 7), the management server 600 obtains the notification destination (in this case, the email address EAD1) for the administrator of the communication device 100. Further, in S450, the management server 600 obtains the request for the PIN (i.e., the authentication information) from the terminal device 200, which request will also be referred to as the first request.

In S535 (FIG. 7), the management server 600 associates the provisional registration identifier CID2 with the delivery destination ADR3 and the email address EAD1 (FIG. 9A). In S520 (FIG. 7), the connection server 500 associates the code PIN1 with the provisional registration identifier CID2 (FIG. 9B). In S580 (FIG. 8), the connection server 500 associates the provisional registration identifier CID2 with the device identifier DID3 (FIG. 9C) by associating the code PIN1 with the device identifier DID3. In S610 (FIG. 8), the management server 600 associates the device identifier DID3 and the first locator OUTU1 with the delivery destination ADR3 and the email address EAD1. The processing server 700 associates the email address EAD1 with the code PIN1 and the device identifier DID3 by executing the processes of S535, S520, S580 and S610.

In S540 (FIG. 7), the management server 600 transmits the code PIN1 to the terminal device 200. In S570 (FIG. 8), the connection server 500 obtains the code PIN1 from the communication device 100. Between the communication device 100 and the terminal device 200, the transmission source of the code PIN1 is the communication device 100 which is different from the terminal device 200 which is the transmission source of the request for the PIN (FIG. 7: S450). The code PIN1 obtained from the communication device 100 is information transmitted by the communication device 100 based on the code PIN1 received by the terminal device 200. In the modified embodiment, the terminal device 200 displays the received code PIN1 on the display 240 in S550 (FIG. 7). In S560 (FIG. 8), the user observes the code PIN1 displayed by the terminal device 200, and inputs the code PIN1 into the communication device. In this way, the code PIN1 is provided, by the user, from the terminal device 200 to the communication device 100. The communication device 100 is configured to receive the code PIN1 received by the terminal device 200. Concretely, the communication device 100 is configured to receive the code PIN1 via the operation of the operation panel 150 by the user.

In S320 (FIG. 5), the management server 600 transmits the one-time URL (in this case, the first locator OTU1) to the email address EAD1 which is associated with the code PIN1 obtained from the printer 100 in S570 (FIG. 8). As described with reference to S330-S370 of FIG. 5, the user inputs the subscriber identifier (in this case, the first subscriber identifier LID1), which is an example of an administrator information for identifying the administrator, via the web page corresponding to the first locater OTU1. As above, the first locator OTU1 indicates the request for the administrator information. In the following description, this request for the administrator information will also be referred to as the second request.

In S370 (FIG. 5), the management server 600 obtains a response transmitted by the administrator's device 300 based on the first locator OTU1. This response contains the administrator information (in this case, the first subscriber identifier LID1). In S880 (FIG. 5), by updating the delivery table 632 (FIG. 9E), the management server 600associtaes the administrator information (in this case, the first subscriber identifier LID1) with the device identifier DID3 of the communication device 100.

In this way, when the user of the communication device 100 is different from the administrator of the communication device 100, the processing server 700 can associate the administrator information (in this case, the first subscriber identifier LID1) with the device identifier DID3 of the communication device appropriately.

As described with reference to S320-S350 of FIG. 5, the second request (S320) contains data indicating the first locator OTU1, and the data indicating the first locator OTU1 is the data for displaying the sig-in screen on the administrator's device 300 (S355). Then, in S370, the administrator's device 300 transmits a response containing information input in the sign-in screen to the management server 600. The administrator information contained in this response indicates the administrator information (in this case, the first subscriber identifier LID1) input to the sign-in screen. According to this configuration, the processing server 700 can associate the administrator information input to the sign-in screen with the device identifier DID3 of the communication device 100 appropriately.

As described above with reference to S440 and S450 (FIG. 7), the notification destination to the administrator is the email address of the administrator. Therefore, by transmitting the second request to the email address of the administrator (FIG. 5: S320), the processing server 700 can associate the administrator information with the identification information of the communication device appropriately.

In S450 (FIG. 7), the management server 600 obtains the delivery destination ADR3 from the terminal device 200. The delivery destination ADR3 is an example of the device information to be associated with the communication device 100. In S880 (FIG. 5), the management server 600 associates the device identifier DID3 of the communication device 100 with the delivery destination ADR3 by updating the delivery table 632 (FIG. 9E). The updated delivery table 632 (FIG. 9E) and the registration table 631 (FIG. 2A) associates the subscriber identifier LID1 with the device identifier DID3 and the delivery destination ADR3 via the subscription identifier ZID. As above, the processing server 700 can associate the administrator information with the identification information and the device information of the communication device appropriately. Further, the device information contains the delivery destination ADR of the consumables. As above, the processing server 700 can associate the administrator information with the identification information of the communication device and the delivery destination appropriately.

In S450 (FIG. 7), the management server 600 obtains the first request which is the authentication information (in this case, the PIN) from the terminal device 200. In S570 (FIG. 8), the connection server 500 obtains the code PIN1 from the communication device 100. The processing server 700 can associate the administrator information with the identification information of the communication device appropriately with use of the code PIN1 obtained from the communication device 100.

In S450 (FIG. 7), the management server 600 obtains the notification destination (in this case, the email address EAD1) from the terminal device 200. Accordingly, the processing server 700 can associate the administrator information with the identification information of the communication device appropriately with use of the notification destination obtained from the terminal device 200. Further, as described with reference to S440, the notification destination indicates the notification destination input to the terminal device 200. Accordingly, the processing server 700 can associate the administrator information and the identification information of the communication device appropriately with use of the notification destination input to the terminal device 200.

In the modified embodiment, no time limit is set for obtaining the code PIN1 from the communication device 100 (FIG. 8: S570). The reason why the time limit is not set is that an appropriate combination of the code PIN1 and the delivery destination ADR3 is associated with the temporary delivery table 634 (FIG. 9A) and the temporary device table 533 (FIG. 9B) at a PIN generation (FIG. 7: S510) stage. That is, even though a time period from the generation of the code PIN1 (FIG. 7: S510) to the acquisition of the code PIN (FIG. 8: S570) is relatively long, a possibility that an inappropriate delivery destination ADR is associated with the administrator information is small. It is noted that, in the modified embodiment, the processor 510 of the connection server 500 may interrupt the registration of the printer 100 when the PIN is obtained after the time limit as in S265 and S270 of FIG. 4.

C. FURTHER MODIFICATIONS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(1) The delivery destination ADR (FIG. 2B, FIG. 6C, FIG. 9E) is not necessarily limited to the delivery destination of the ink, but can be the delivery destination of any consumable used by the communication device (e.g., the printer 100), such as printing sheets, toner, photosensitive drum, and the like. For example, the device information may contain information on a payment method of a fee for printing services. It is noted that the device information may be omitted from the information that is registered in association with the device identifier DID.

(2) The notification destination which is the destination of the notification to the administrator of the communication device may be any destination instead of the email address EAD (FIG. 6B, FIG. 9A). For example, the notification destination may be a phone number that is the destination of an SMS (short message service), or a user identifier of a messaging application realizing transmission/reception of information among multiple users. In either case, the request for the administrator's information (FIG. 5: S320) transmitted to the notification destination may be received by a receiving device different from the administrator's device 300. In S330, the administrator may input an access instruction in the administrator's device 300 by operating the administrator's device in accordance with the request received by the receiving device.

(3) The request for the administrator information (FIG. 5: S320) is not necessarily limited to the one-time URL indicating a web page, but may be any information indicating the request for the administrator information. For example, the request may indicate a text message directed to the administrator. Such a text message may contain any message asking a request to transmit a response from the administrator's device 300. The administrator may operate the operation panel 350 of the administrator's device 300 in accordance with the text message to cause the administrator's device 300 to transmit the response. Such a response may contain the administrator information (e.g., the subscriber identifier LID1).

(4) The method of obtaining the administrator's information by the administrator's device 300 may be any other method instead of the input by operation of the operation panel 350 (FIG. 5: S360). For example, the storage 315 (e.g., the non-volatile storage 330) of the administrator's device 300 may store, in advance, data indicating the administrator information. Then, in S370 (FIG. 5), the processor 310 may refer to the data to obtain the administrator information.

(5) The first device, which is the device of the transmission source of the notification destination, may be the printer 100 instead of the terminal device 200. For example, the user may input the notification destination to the printer 100 by operating the operation unit 150 of the printer 100. The processor 110 of the printer 100 may transmit data indicating the notification destination as input to the processing server 700 (e.g., the connection server 500 or the management server 600). Instead of the input of the notification destination by the user to the first device, the first device may obtain the notification destination by any other method. For example, data indicating the notification destination may be stored in advance in the storage device of the first device. The first device may refer to this data to obtain the notification destination.

(6) The process of registering the information related to the communication device in the processing server 700 may be, instead of the processed in the above-described embodiment, modified embodiment and further modifications, any of other processes. For example, the establishment of the continuous connection between the processing server 700 and the communication device 100 may be omitted.

In S240 (FIG. 4), the user may input the subscriber identifier LID1 in addition to the one-time code OTC1. Then, in S250, the terminal device 200 may be configured to transmit data representing both the one-time code OTC1 and the subscriber identifier LID1 to the management server 600. In such a case, the sign-in by the administrator (FIG. 5: S320-S370) may be omitted.

The subscriber identifier LID1 may be associated, in advance, with the email address EAD1 input in S240 (FIG. 4). The processing server 700 may associate information related to the printer 100 with the subscriber identifier LID1 which is associated with the email address EAD1. In such a case, the sign-in by the administrator (FIG. 5: S320-S370) may be omitted.

The registration form accessed in S220 (FIG. 4) may be a form which is associated, in advance, with the subscriber identifier LID1. The processing server 700 may associate the information related to the printer 100 with the subscriber identifier LID1 which is associated with the registration form. In such a case, the sign-in by the administrator (FIG. 5: S320-S370) may be omitted.

The registration processes respectively for multiple printers may be performed in parallel. For example, the registration processes of FIGS. 7, 8 and 5 for multiple printers may be executed in parallel. It is noted that the provisional registration identifier (FIG. 7: S470) and the PIN (S520) may be determined to be different values for respective printers. According to this configuration, the processing server 700 can register multiple pieces of information for the multiple printers, respectively, and appropriately.

The provisional registration identifier (FIG. 7: S470) may be common among multiple printers, and the PINs (S510) may be determined to have different values for respective printers. In such a case, in S530 (FIG. 7), the management server 600 stores, in the temporary delivery table 634 (FIG. 9A), a relationship among the delivery destination ADR3, the email address EAD1, the provisional registration identifier CID2 and the code PIN1. In S994 (FIG. 8), the connection server 500 transmits the code PIN1 associated with the device identifier DID3 to the management server 600 in addition to the device identifier DID3. In S610, the management server 600 associates the first locator OTU1 and the device identifier DID3 with the relationship containing the code PIN1 from among one or more relationships contained in the temporary delivery table 634. According to this configuration, the processing server 700 can register information on each of the multiple printers appropriately.

(7) The authentication information may be any information instead of the one-time code and the PIN. For example, the authentication information may be an image such as a geometric pattern or a photograph. In either case, instead of newly generating the authentication information (FIG. 3: S160, FIG. 7: S510), the processing server 700 may select the authentication information to be used from among multiple pieces of authentication information determined in advance. As above, the processing server 700 may be configured to determine the authentication information to be used based on any of various processes such as a generating process, a selection process and the like. Alternatively, the authentication information may be information determined in advance. In such a case, the processing server 700 may be configured such that, when the registration process of one communication device is being performed, the registration processes for other communication devices are prohibited.

(8) The receiving device configured to receive the authentication information transmitted by the processing server 700 (FIG. 3: S190, FIG. 7: S540) may be an arbitrary one of the terminal device 200 and the communication device 100. Further, a transmitting device configured to transmit the authentication information to the processing server 700 may be different one of the receiving device, which is one of the terminal device 200 and the communication device 100. In this case, the method of transmitting the authentication information from the receiving device to the transmitting device may be an arbitrary method. For example, the receiving device may be configured to display an image indicating the authentication information (e.g., a barcode or a QR code (registered trademark of DENSO WAVE)), and the transmitting device may obtain the authentication information by reading the displayed image with a digital camera. Alternatively, the receiving device may transmit data representing the authentication information via a network. In either case, the transmitting device may be configured to obtain the authentication information in response to an operation by the user.

(9) In the embodiment shown in FIG. 4, the effective time T (FIG. 4: S265, S270, FIG. 6A) for obtaining the authentication information is the date and time after the elapse of the validity time dT from the registration date RT of the authentication information. In this configuration, the effective time dT may be variable. For example, the processor 510 of the connection server 500 may vary the effective time dT depending on a type of the printer. Further, the determination of the term T (S265) may be performed at any time between the generation of the authentication information by the processing server 700 (FIG. 3: S160) and the determination of the term T (S270). The connection server 500 may be configured to determine the term T instead of the connection server 500. In the embodiment shown in FIG. 4, the processes related to the term T (i.e., S265 and S270) may be omitted.

(10) The registration process may be configured to perform various processes, instead of various processes in the above-described embodiment, modified embodiment and modifications. For example, the processing server 700 may be configured to perform processes indicated below.

The process of obtaining a notification destination, which is the destination of the notification to the administrator of the communication device 100, from the first device, which is either the terminal device 200 or the communication device 100 (e.g., S250 (FIG. 4), S450 (FIG. 7)).

The process of obtaining the first request from the second device, which is either the terminal device 200 or the communication device 100, indicating a request for information for use of the communication device 100 (e.g., S150 (FIG. 3), S450 (FIG. 7)).

The process of associating the notification destination, the authentication information, which is information for the use of the communication device 100, and the identification information of the communication device 100 (e.g., the processes of S165 and S310, and the processes of S520, S535, S580 and S610).

The process of transmitting the authentication information to the second device (e.g., FIG. 3: S190, FIG. 7: S540).

The process of obtaining the authentication information from a third device which is one of the terminal device 200 and the communication device 100 and different from the second device (e.g., FIG. 4: S250, FIG. 8: S570). In this case, the authentication information from the third device is the information transmitted to the third device based on the authentication information received by the second device.

The process of transmitting a second request indicating a request for the administrator information to identify the administrator to the communication destination associated with the authentication information obtained from the third device (e.g., FIG. 5: S320).

The process of obtaining a response, which is transmitted by the administrator's device 300 based on the second request and contains the administrator information, the response being a response (e.g., FIG. 5: S370).

The process of associating the administrator information with the identification information of the communication device 100 (e.g., FIG. 5: S880).

Any of the above processes may include a plurality of processes. The process of S250 in FIG. 4 includes the process of obtaining the notification destination and the process of obtaining the authentication information. As such, a single process may include multiple processes. Further, one or more of the above processes may be omitted from the processes performed by the processing server 700. For example, the communication device, the terminal device or the administrator's device may perform one or more of the above processes. The processing server 700 may be configured to further perform various processes in addition to the above processes.

(11) The communication device may be a variety of devices configured to perform particular functions in place of the printer 100. For example, the communication device may be a scanner configured to optically read an object. In any case, it is preferable that the processing server 700 associates the administrator information with the identification information of the communication device. Such an association can be used in various services. For example, the service provider may provide a cloud storage facility to subscribers for storing image data generated by scanners. The processing server (processing server) 700 may allow scanners having identification information that is associated with the administrator information to use the cloud storage.

(12) A single server device may provide all the functions of the processing server 700. In such a case, a single server device may perform both the functions of the connection server 500 and the management server 600. It is noted that, in such a case, the communication process between the connection server 500 and the management server 600 is omitted. The tables 631, 632, and 531 (FIGS. 2A-2C) may be aggregated into a single table. Furthermore, multiple devices (e.g., computers) that can communicate with each other via a network may share some of the functions of the registration process performed by the processing server and, as a whole, provide the functions of the registration process (a system equipped with these devices corresponds to a server). The various relationships (e.g., the relationship between the subscriber identifier LID and the device identifier DID) may be indicated by multiple pieces of data. For example, relationships may be indicated by multiple pieces of data distributed across multiple devices.

In each of the above-described embodiment, modified embodiment and modifications, a part of the configuration realized by hardware may be replaced with software, or conversely, a part or all of the configuration realized by software may be replaced with hardware. For example, the function of generating the one-time code (S160) in FIG. 3 may be realized by a dedicated hardware circuit.

When some or all of the functions according to aspects of the present disclosures are realized by a computer program, the program can be provided in a form stored in a computer-readable recording medium (e.g., a non-transitory recording medium). The program may be used in the same or a different recording medium (computer-readable recording medium) as when provided. The term "computer-readable recording medium" is not necessarily limited to portable recording media such as memory cards and/or CD-ROMs, but can also include internal storage devices in computers, such as various ROMs, and external storage devices connected to the computer, such as hard disk drives.

The embodiment, modified embodiment and modifications described above are intended to facilitate understanding of aspects of the present disclosures and are not intended to limit the same. The aspects of the present disclosures may be changed and/or improved without departing from its intent, and the aspects of the present disclosures include equivalents thereof.

The technology disclosed above can be realized in various forms, such as a method of processing data and a device (e.g., a server) configured to process data, a computer program realizing the functions of the method or device, a recording medium containing such a computer program (e.g., a non-transitory computer-readable recording medium).

What is claimed is:

1. A server of a communication system including a terminal device, a communication device and an administrator's device, the server comprising:
   a communication interface; and
   a controller including hardware,
   the server being communicative with the terminal device, the communication device and the administrator's device via the communication interface, wherein the communication device is a printer,
   the controller being configured to perform:
   first obtaining a notification destination that is a notification destination for an administrator of the communication device from a first device which is one of the terminal device and the communication device;
   second obtaining a first request indicating a request for authentication information to use the communication device from the communication device;
   first associating the notification destination, the authentication information that is information required to use the communication device, and identification information of the communication device;
   first transmitting the authentication information to the communication device via the communication interface after obtaining the first request;
   third obtaining the authentication information from the terminal device, the authentication information obtained from the terminal device is information transmitted by the terminal device based on the authentication information received by the communication device;
   determining whether the authentication information obtained in the third obtaining is the same as the authentication information associated with the notification destination and the identification information in the first associating;
   performing further processing in response to the authentication information obtained in the third obtaining being the same as the authentication information that is associated with the notification destination and the identification information in the first associating, such further processing including:
   second transmitting a second request indicating a request for administrator information to identify the administrator to the notification destination associated with the authentication information obtained from the terminal device;
   fourth obtaining a response transmitted by the administrator's device based on the second request and containing the administrator information; and
   second associating the administrator information with the identification information of the communication device in a registration table, thereby the communication device being registered in the server.

2. The server according to claim 1,
   wherein the second request contains data to have the administrator's device display a sign-in screen, and
   wherein the administrator information contained in the response transmitted by the administrator's device indicates the administrator information input to the sign-in screen.

3. The server according to claim 1,
   wherein the notification destination is an email address of the administrator.

4. The server according to claim 1,
   wherein the controller is further configured to perform:
   fifth obtaining device information that is information to be associated with the communication device from the terminal device,
   wherein the second associating associates the identification information of the communication device with the device information.

5. The server according to claim 4,
   wherein the device information contains a delivery destination of a consumable used by the communication device.

6. The server according to claim 1,
   wherein the printer includes a print engine,
   wherein the first transmitting transmits data causing the print engine to print the authentication information to the communication device, and
   wherein the authentication information obtained from the terminal device that is the terminal device indicates the authentication information input to the terminal device.

7. The server according to claim 1,
   wherein the first device is the terminal device.

8. The server according to claim 1,
   wherein the controller is further configured to perform:
   determining a term for obtaining the authentication information from the terminal device based on a timing of the first associating; and
   when the authentication information is obtained from the terminal device after the term, prohibiting transmission of the second request, while when the authentication information is obtained from the terminal device before the term, allowing transmission of the second request.

9. A server of a communication system including a terminal device, a communication device and an administrator's device, the server comprising:
   a communication interface; and
   a controller including hardware,
   the server being communicative with the terminal device, the communication device and the administrator's device via the communication interface, wherein the communication device is a printer,
   the controller being configured to perform:
   first obtaining a notification destination that is a notification destination for an administrator of the communication device from a first device which is one of the terminal device and the communication device;
   second obtaining a first request indicating a request for authentication information to use the communication device from the terminal device;
   first associating the notification destination, the authentication information that is information required to use the communication device, and identification information of the communication device;
   first transmitting the authentication information to the terminal device via the communication interface after obtaining the first request;
   third obtaining the authentication information from the communication device, the authentication information obtained from the communication device is information transmitted by the communication device based on the authentication information received by the terminal device;
determining whether the authentication information obtained in the third obtaining is the same as the authentication information associated with the notification destination and the identification information in the first associating;
performing further processing in response to the authentication information obtained in the third obtaining being the same as the authentication information that is associated with the notification destination and the identification information in the first associating, such further processing including:
second transmitting a second request indicating a request for administrator information to identify the administrator to the notification destination associated with the authentication information obtained from the communication device;
fourth obtaining a response transmitted by the administrator's device based on the second request and containing the administrator information; and
second associating the administrator information with the identification information of the communication device in a registration table, thereby the communication device being registered in the server.

10. The server according to claim 9,
wherein the second request contains data to have the administrator's device display a sign-in screen, and
wherein the administrator information contained in the response transmitted by the administrator's device indicates the administrator information input to the sign-in screen.

11. The server according to claim 9,
wherein the notification destination is an email address of the administrator.

12. The server according to claim 9,
wherein the controller is further configured to perform:
fifth obtaining device information that is information to be associated with the communication device from the terminal device,
wherein the second associating associates the identification information of the communication device with the device information.

13. The server according to claim 12,
wherein the device information contains a delivery destination of a consumable used by the communication device.

14. The server according to claim 9,
wherein the first device is the terminal device.

15. The server according to claim 14,
wherein the notification destination indicates a notification destination to be input to the first device that is the terminal device.

16. The server according to claim 9,
wherein the controller is further configured to perform:
determining a term for obtaining the authentication information from the communication device based on a timing of the first associating; and
when the authentication information is obtained from the communication device after the term, prohibiting transmission of the second request, while when the authentication information is obtained from the communication device before the term, allowing transmission of the second request.

17. A communication system comprising a terminal device, a communication device, and a server,
the terminal device comprising:
a terminal-device side communication interface; and
a terminal-device side controller including hardware,
the communication device comprising:
a communication-device side communication interface; and
a communication-device side controller including hardware,
wherein the communication device is a printer,
the server comprising:
a server side communication interface; and
a server side controller including hardware,
the server being communicative with the terminal device via the terminal-device side communication interface and the server side communication interface, the server being communicative with the communication device via the communication-device side communication interface and the server side communication interface, the server being communicative with an administrator device via an administrator-device side communication interface and the server side communication interface,
one of the terminal device or the communication device serving as a first device having a first-device side communication interface and a first-device side controller,
the first-device side communication interface being the terminal-device side communication interface when the first device is the terminal device,
the first-device side communication interface being the communication-device side communication interface when the first device is the communication device, the first-device side controller being the terminal-device side controller when the first device is the terminal device,
the first-device side controller being the communication-device side controller when the first device is the communication device,
the first-device side controller being configured to perform:
transmitting a notification destination representing a destination of a notification for an administrator of the communication device,
the communication-device side controller being configured to perform:
transmitting, to the server, a first request indicating a request for authentication information necessary to use the communication device; and
receiving, from the server, the authentication information after the first request is transmitted,
the terminal-device side controller being configured to perform:
transmitting, to the server, the authentication information based on the authentication information received by the communication device,
the server side controller being configured to perform:
first obtaining the notification destination from the first device;
second obtaining the first request from the communication device;
first associating the notification destination, the authentication information, and identification information of the communication device;
first transmitting the authentication information to the communication device via the communication interface after obtaining the first request;

third obtaining the authentication information from the terminal device;

determining whether the authentication information obtained in the third obtaining is the same as the authentication information associated with the notification destination and the identification information in the first associating;

performing further processing in response to the authentication information obtained in the third obtaining being the same as the authentication information that is associated with the notification destination and the identification information in the first associating, such further processing including:

second transmitting a second request indicating a request for administrator information to identify the administrator to the notification destination associated with the authentication information obtained from the terminal device;

fourth obtaining a response transmitted by the administrator's device based on the second request and containing the administrator information; and second associating the administrator information with the identification information of the communication device in a registration table, thereby the communication device being registered in the server.

18. A communication system comprising a terminal device a communication device, and a server, the terminal device comprising:
a terminal-device side communication interface; and
a terminal-device side controller including hardware, the communication device comprising:
a communication-device side communication interface; and
a communication-device side controller including hardware,
wherein the communication device is a printer, the server comprising:
a server side communication interface; and
a server side controller including hardware,
the server being communicative with the terminal device via the terminal-device side communication interface and the server side communication interface, the server being communicative with the communication device via the communication-device side communication interface and the server side communication interface, the server being communicative with an administrator device via an administrator-device side communication interface and the server side communication interface, one of the terminal device or the communication device serving as a first device having a first-device side communication interface and aa first-device side controller, the first-device side communication interface being the terminal-device side communication interface when the first device is the terminal device, the first-device side communication interface being the communication-device side communication interface when the first device is the communication device, the first-device side controller being the terminal-device side controller when the first device is the terminal device, the first-device side controller being the communication-device side controller when the first device is the communication device, the first-device side controller being configured to perform:

a transmitting device configured to transmit a notification destination representing a destination of a notification for an administrator of the communication device, the communication device comprising:
a first request transmitting device configured to transmit, to the server, a first request indicating a request for authentication information necessary to use the communication device; and
a receiving device configured to receive, from the server, the authentication information after the first request is transmitted, the terminal device comprising:
an authentication information transmitting device configured to transmit, to the server, the authentication information based on the authentication information received by the communication device, the server side controller being configured to perform:
first obtaining the notification destination from the first device;
second obtaining the first request from the terminal device;
first associating the notification destination, authentication information that is information required to use the communication device, and identification information of the communication device;
first transmitting the authentication information to the terminal device via the communication interface after obtaining the first request;
third obtaining the authentication information from the communication device;
determining whether the authentication information obtained in the third obtaining is the same as the authentication information associated with the notification destination and the identification information in the first associating;
performing further processing in response to the authentication information obtained in the third obtaining being the same as the authentication information that is associated with the notification destination and the identification information in the first associating, such further processing including:
second transmitting a second request indicating a request for administrator information to identify the administrator to the notification destination associated with the authentication information obtained from the communication device;
fourth obtaining a response transmitted by the administrator's device based on the second request and containing the administrator information; and
second associating the administrator information with the identification information of the communication device in a registration table, thereby the communication device being registered in the server.

* * * * *